US005141834A

United States Patent [19]

Kubo et al.

[11] Patent Number: 5,141,834

[45] Date of Patent: Aug. 25, 1992

[54] CARRIERS FOR DEVELOPING ELECTROSTATIC IMAGES

[75] Inventors: Motonobu Kubo, Minoo; Hiroshi Inukai, Takatsuki; Takahiro Kitahara, Suita, all of Japan

[73] Assignee: Daikin Industries, Ltd., Japan

[21] Appl. No.: 410,504

[22] Filed: Sep. 21, 1989

[30] Foreign Application Priority Data

Oct. 3, 1988 [JP] Japan ................................ 63-249531
Oct. 3, 1988 [JP] Japan ................................ 63-249532

[51] Int. Cl.[5] ........................ G03G 9/00; B32B 23/02; B32B 27/02

[52] U.S. Cl. ..................................... 430/108; 428/407

[58] Field of Search ......................... 430/108; 428/407

[56] References Cited

U.S. PATENT DOCUMENTS

| | | | |
|---|---|---|---|
| 4,272,184 | 6/1981 | Rezanka et al. | 430/108 |
| 4,555,543 | 11/1985 | Effenberger et al. | 524/520 |
| 4,614,700 | 9/1986 | Yamamoto et al. | 430/108 |
| 4,725,521 | 2/1988 | Shigeta et al. | 430/108 |
| 4,758,618 | 7/1988 | Ito et al. | 524/430 |
| 4,912,004 | 3/1990 | Nagatsuka et al. | 430/108 |
| 4,929,528 | 3/1990 | Shinoki et al. | 430/108 |
| 5,059,504 | 10/1991 | Shinoki et al. | 430/108 |

*Primary Examiner*—Marion E. McCamish
*Assistant Examiner*—S. Crossan
*Attorney, Agent, or Firm*—Larson and Taylor

[57] ABSTRACT

Disclosed are a carrier for developing electrostatic images, the carrier comprising a core and a coating on the core, the coating being formed from a copolymer comprising about 50 to about 90 mole % of vinylidene fluoride, about 5 to about 45 mole % of tetrafluoroethylene and about 1 to about 30 mole % of a fluorine-containing unsaturated polymerizable compound; and a carrier for developing electrostatic images, the carrier comprising a core and a coating on the core, the coating being formed from a copolymer comprising about 50 to about 90 mole % of vinylidene fluoride and about 50 to about 10 mole % of at least one fluorine-containing unsaturated polymerizable compound selected from the group consisting of trifluorochloroethylene, 1,1-dihydrohexafluoroisobutene, hexafluoropropylene, perfluoro(alkyl vinyl ether), trifluoroethylene and hexafluoroacetone.

1 Claim, No Drawings

CARRIERS FOR DEVELOPING ELECTROSTATIC IMAGES

FIELD OF THE INVENTION

The present invention relates to a carrier for developing electrostatic images which constitutes, along with a toner, an electrostatic image developer for use with an electronic photographic copying machine (hereinafter referred to simply as "carrier").

BACKGROUND OF THE INVENTION

Known carriers include those coated with a copolymer comprising vinylidene fluoride (hereinafter generally referred to as "VdF") and tetrafluoroethylene (hereinafter generally referred to as "TFE") (Japanese Unexamined Patent Publication No. 58-20,875). However, the copolymer in the carriers has a low solvent solubility and thus only a limited range of solvents can be used in application of the copolymer onto the carrier core composed of powders of iron, ferrite and the like. Further the copolymer can not be dissolved to a high concentration, posing the problems of entailing a low productivity and giving only thin coatings with low strength and poor adhesion to the core.

Also known are carriers coated with a VdF/TFE/vinyl butyrate copolymer (Japanese Unexamined Patent Publication No. 54-110,839). With the fluorine-free monomer present as the third component, this type of copolymer exhibits a high solvent solubility but a small electrostatic charge capacity when used for coating the carrier core.

SUMMARY OF THE INVENTION

It is the primary object of the present invention to provide a carrier comprising a core and a coating on the core, the coating being composed of a copolymer excellent in the solvent solubility.

It is another object of the invention to provide a carrier comprising a core and a coating on the core, the coating having a good adhesion to the core and high strength.

It is a further object of the invention to provide a carrier comprising a core and a coating on the core, the coating having a great electrostatic charge capacity.

Other objects and features of the invention will become apparent from the following description.

We conducted extensive research to overcome the foregoing problems of the conventional techniques and found that copolymers comprising VdF, TFE and a fluorine-containing unsaturated polymerizable compound exhibit outstanding properties when used for coating the carrier core.

According to the present invention, there is provided a carrier for developing electrostatic images, the carrier comprising a core and a coating on the core, the coating being formed from a copolymer comprising about 50 to about 90 mole % of vinylidene fluoride, about 5 to about 45 mole % of tetrafluoroethylene and about 1 to about 30 mole % of a fluorine-containing unsaturated polymerizable compound (hereinafter referred to as "first invention").

We also discovered that copolymers comprising VdF and a specific fluorine-containing unsaturated polymerizable compound show excellent properties in use for coating the carrier core.

According to the invention, there is also provided a carrier for developing electrostatic images, the carrier comprising a core and a coating on the core, the coating being formed from a copolymer comprising about 50 to about 90 mole % of vinylidene fluoride and about 50 to about 10 mole % of at least one fluorine-containing unsaturated polymerizable compound selected from the group consisting of trifluorochloroethylene, 1,1-dihydrohexafluoroisobutene, hexafluoropropylene, perfluoro(alkyl vinyl ether), trifluoroethylene and hexafluoroacetone (hereinafter referred to as "second invention").

DETAILED DESCRIPTION OF THE INVENTION

The first invention and the second invention will be described below in greater detail.

I. First Invention

There is no specific restriction on the kind of fluorine-containing unsaturated polymerizable compounds for conjoint use as a comonomer with VdF and TFE in the first invention. Examples of such compounds are vinyl fluoride, trifluoroethylene, trifluorochloroethylene, hexafluoropropylene, dichlorodifluoroethylene, trifluoropropene, 1,1-dihydrohexafluoroisobutylene, hexafluoroacetone, perfluoromethyl vinyl ether, perfluoropropyl vinyl ether and like fluoroolefins; trifluorovinyl acetate and like fluorine-containing vinyl esters; and 2,2,2-trifluoroethyl vinyl ether, 2,2,4,4-tetrafluoropropyl vinyl ether and like fluorine-containing vinyl ethers. These fluorine-containing unsaturated polymerizable compounds are usable singly or at least two of them can be used in mixture. It is preferred to use vinyl fluoride, trifluoroethylene, trifluorochloroethylene, hexafluoroacetone, perfluoropropyl vinyl ether and the like in view of the strength and hardness of the coating layer of carriers.

The copolymer for use as coating materials for the carrier core in the first invention comprises about 50 to about 90 mole % of VdF, about 5 to about 45 mole % of TFE and about 1 to about 30 mole % of the fluorine-containing unsaturated polymerizable compound. The molecular weight of the copolymer as determined by gel permeation chromatography is usually about 10,000 to about 150,000 (number average molecular weight calculated as polystyrene). The copolymer containing less than 1 mole % of the fluorine-containing unsaturated polymerizable compound is insufficiently improved in properties (particularly in the solubility) as compared with the two-component (VdF/TFE) copolymer, whereas over 30 mole % of the polymerizable compound used gives a rubberlike copolymer, which forms a coating layer of reduced strength, hence undesirable. A more preferred composition of the copolymer comprises about 60 to about 90 mole % of VdF, about 5 to about 25 mole % of TFE and about 1 to about 15 mole % of the fluorine-containing unsaturated polymerizable compound.

The carrier core can be coated by the conventional method or a similar one. More specifically, the surface of the carrier core is coated by the desired conventional method with a solution of the terpolymer in a solvent such as acetone, methyl ethyl ketone, methyl isobutyl ketone or like ketone solvents, tetrahydrofuran, dioxane, ethyl acetate, dimethylformamide or the like. A preferred solvent has a boiling point of about 80° to about 140° C. in view of the evaporation rate and the like.

The materials useful for the formation of the carrier core in the first invention are not specifically limited and can be any of conventional materials such as iron, cobalt. nickel and like metals; ferrite, magnetite, Mn-Cu-Al, Mn-Cu-Sn and like alloys; and $CrO_2$ and like metallic oxides.

Optionally the coating material for coating the carrier core in the first invention may be a mixture of the foregoing solution of the terpolymer with a homopolymer and/or a copolymer both compatible with the solution. The polymers to be mixed with the solution are not specifically limited. Yet desirable are those capable of improving the adhesion between the core and the resin layer and more desirable are methyl methacrylate polymers. The amount of the polymer to be mixed is about 10 to about 100 parts by weight per 100 parts by weight of the terpolymer.

The thickness of a coating layer to be formed on the carrier core in the first invention can be varied as desired, but is usually about 0.5 to about 50 μm, preferably about 1 to about 5 μm.

II. Second Invention

The fluorine-containing unsaturated polymerizable compound for conjoint use as the copolymer component with VdF in the second invention is at least one compound selected from the group consisting of trifluorochloroethylene, 1,1-dihydrohexafluoroisobutene, hexafluoropropylene, perfluoro(alkyl vinyl ether), trifluoroethylene and hexafluoroacetone. The perfluoro(alkyl vinyl ether) is not specifically limited and can be any of conventional ones including compounds represented by the formula $$CF{=}CF{-}(O{-}CF_2\underset{CF_3}{\underset{|}{CF}})_m{-}O{-}(CF_2)_nCF_2X$$

wherein X is an hydrogen atom or a fluorine atom, m is an integer of 0 to 4 and n is an integer of 0 to 7. Specific examples are perfluoro(methyl vinyl ether), perfluoro(ethyl vinyl ether), perfluoro(propyl vinyl ether), $$CF_2{=}CF{-}O{-}CF_2\underset{CF_3}{\underset{|}{CF}}{-}O{-}CF_2CF_3,$$

$$CF_2{=}CF{-}O{-}CF_2\underset{CF_3}{\underset{|}{CF}}{-}O{-}(CF_2)_2CF_3,$$

$$CF_2{=}CF{-}O{-}CF_2\underset{CF_3}{\underset{|}{CF}}{-}O{-}(CF_2)_3CF_3,$$

$$CF_2{=}CF{-}(O{-}CF_2\underset{CF_3}{\underset{|}{CF}})_2{-}O{-}CF_2CF_3,$$

$$CF_2{=}CF{-}(O{-}CF_2\underset{CF_3}{\underset{|}{CF}})_2{-}O{-}(CF_2)_2CF_3,$$

$$CF_2{=}CF{-}(O{-}CF_2\underset{CF_3}{\underset{|}{CF}})_2{-}O{-}(CF_2)_3CF_3,$$

and the like.

These fluorine-containing unsaturated polymerizable compounds are usable singly or at least two of them can be used in mixture. In view of the strength and the hardness of a coating layer, it is preferred to use trifluorochloroethylene, trifluoroethylene, hexafluoroacetone, perfluoropropyl vinyl ether or the like.

The copolymer to be used for coating the carrier core in the second invention comprises about 50 to about 90 mole % of VdF and about 50 to about 10 mole % of the fluorine-containing unsaturated polymerizable compound. The molecular weight of the copolymer as determined by gel permeation chromatography is usually about 10,000 to about 150,000 (number average molecular weight calculated as polystyrene). Less than 10 mole % of the fluorine-containing unsaturated polymerizable compound used results in the production of a copolymer unsatisfactorily improved in properties (particularly in the solubility), whereas over 50 mole % of the polymerizable compound used gives a rubberlike copolymer, which forms a coating layer of reduced duration, hence undesirable. A more preferred composition of the copolymer comprises about 70 to about 90 mole % of VdF and about 30 to about 10 mole % of the fluorine-containing unsaturated polymerizable compound.

The carrier core can be coated by the conventional method or a similar one in the second invention. More specifically, the surface of the carrier core is coated by a desired conventional method with a solution of the copolymer in a solvent such as acetone, methyl ethyl ketone, methyl isobutyl ketone or like ketone solvents, ethyl acetate, n-butyl acetate or like ester solvents, tetrahydrofuran, dioxane, dimethylformamide or like solvents. A preferred solvent has a boiling point of about 80° to about 140° C. in view of the evaporation rate and the like.

Examples of materials useful for the formation of the carrier core in the second invention are not specifically limited and can be any of conventional materials as in the first invention.

The coating material for coating the carrier core according to the second invention may contain an unsaturated copolymerizable compound as the third component in addition to the foregoing copolymer in such amount that the addition will not impair the properties of the copolymer, e.g. up to about 10 mole %. Examples of such unsaturated copolymerizable compounds are fluorine-containing olefin, fluorine-containing vinyl ether, fluorine-containing vinyl ester, vinyl chloride, vinylidene chloride and like haloolefins; vinyl acetate and like vinyl esters; ethyl vinyl ether and like vinyl ethers; and others such as styrene, ethylene, propylene, etc.

Other polymers may be mixed with the coating material for coating the carrier core in the second invention as in the first invention insofar as the addition does not deteriorate the properties of the coating material. Examples of such polymers are methyl methacrylate polymers, trifluoroethyl methacrylate polymers, etc.

The thickness of a coating layer to be formed on the carrier core can be varied as desired but is usually in the range of 0.5 to about 50 μm, preferably about 1 to about 5 μm.

The copolymers for use in the present invention facilitate the production of carriers because of their high solvent solubility. The coating formed on the carrier core has high strength and good adhesion to the core.

EXAMPLES

Given below are examples and comparison examples to clarify the features of the present invention.

EXAMPLES 1 TO 7

A copolymer comprising specific proportions of VdF, TFE and a fluorine-containing unsaturated polymerizable compound was dissolved in 500 ml of a solvent to obtain a coating solution. One kilogram of spherical iron particles (trademark "DSP 135C," product of Dowa Iron Powder Co., Ltd.) serving as the carrier core material was coated with the solution by the conventional method using a fluidized bed apparatus, giving the carrier of the present invention having a coating layer of 2 μm thickness over the core.

The details of the copolymers, solvents and other material used in respective examples are as follows.

EXAMPLE 1

Copolymer: VdF/TFE/trifluorochloroethylene=75/15/10, number average molecular weight=60,000, 13 g Solvent: methyl isobutyl ketone

EXAMPLE 2

Copolymer: VdF/TFE/trifluoroethylene=80/10/10, number average molecular weight=40,000, 13 g Solvent: methyl isobutyl ketone

EXAMPLE 3

Copolymer: VdF/TFE/hexafluoroacetone=75/20/10, number average molecular weight=80,000, 13 g Solvent: n-butyl acetate/n-ethyl acetate=1/1

EXAMPLE 4

Copolymer: VdF/TFE/hexafluoropropylene=70/20/10, number average molecular weight=100,000, 13 g Solvent: methyl isobutyl ketone

EXAMPLE 5

Copolymer: a mixture of 10 g of the same copolymer as used in Example 1 with 2 g of a methyl methacrylate polymer (trademark "ACRYPET MF," product of Mitsubishi Rayon Co., Ltd.)

Solvent: methyl isobutyl ketone

EXAMPLE 6

Copolymer: 6 g of the same copolymer as used in Example 1 and 6 g of a methyl methacrylate polymer (trademark "ACRYPET MF," product of Mitsubishi Rayon Co., Solvent: methyl isobutyl ketone

EXAMPLE 7

Copolymer: VdF/TFE/trifluorochloroethylene=80/15/5, number average molecular weight=60,000, 25 g Solvent: methyl isobutyl ketone Spherical iron particles: "SHINTO 100-M" (trademark, product of Shinto Brater K.K.), 1 kg

Comparison Example 1

The production of a carrier was attempted by conducting the same procedure as in Example 1 with the exception of using a VdF/TFE copolymer (VdF/TFE=80/20, number average molecular weight=130,000), but the attempt failed because the copolymer was not dissolved in methyl isobutyl ketone.

Comparison Example 2

A comparative carrier was prepared by following the procedure of Example 1 and using a dF/TFE copolymer (VdF/TFE=80/20, number average molecular weight=130,000) and a 1:1 acetone/methyl ethyl ketone mixture as a solvent.

Comparison Example 3

A comparative carrier was prepared using a VdF/TFE/vinyl butyrate copolymer (VdF/TFE/vinyl butyrate=70/20/10, number average molecular weight=100,000) and a 1:1 acetone/methyl ethyl ketone mixture as a solvent.

Test Example 1

Each carrier obtained in Examples 1 to 7 and Comparison Examples 2 and 3 was stirred by a ball mill for 100 hours, and the degree of peel resistance was evaluated by comparing the amounts of the coating dissolved out before and after the stirring.

Table 1 shows the results. The coatings of the obtained carrier specimens had a thickness of 2 μm.

The evaluation of peel resistance was represented according to the following ratings:

A . . . No peeling

B . . . Peeling occurred over less than 5% of coating portions

C . . . Peeling occurred over 5 to 10% of coating portion

D . . . Peeling occurred over 10% or more of coating portion

TABLE 1

| | Degree of peel resistance |
|---|---|
| Example | |
| 1 | A |
| 2 | A |
| 3 | A |
| 4 | B |
| 5 | A |
| 6 | A |
| 7 | A |
| Comp Example | |
| 2 | C |
| 3 | A |

Table 1 shows that the carriers of the first invention had coatings of high strength with excellent adhesion.

Test Example 2

A toner was prepared by mixing together 100 parts by weight of a styrene/methyl methacrylate/n-butyl methacrylate copolymer (=50/20/30), 10 parts by weight of carbon black (trademark "Regal 660R," product of Cabot Co., Ltd.) and 3.5 parts by weight of a low-molecular-weight polypropylene (trademark "Viscol 660P," product of Sanyo Chemical Industry, Ltd.) kneading and grinding the mixture and classifying the particles to obtain toner particles with a mean particle size of 9 μm. Five parts by weight of the toner was mixed with 100 parts by weight of each carrier obtained in Examples 1 to 7 and Comparison Examples 2 and 3, giving a developer for electronic photographic copying machines.

Using the developers thus prepared, a copy operation was continuously carried out to produce 2,500 photocopies on the modified version of electrophotographic copying machine "U-Bix 3000" (trademark, product of Konishiroku Photo Industry Co., Ltd.) incorporating a negative electrostatic dual-layer organic photoconductive photosensitive member containing an anthoanthrone-type pigment as a charge-generation material and a carbazole derivative as a charge-transported material. Images with no fogging were produced using the developers containing the carries of Examples 1 to 7.

On the other hand, the copying operation using the developer with the carrier of Comparison Example 2 initiated fogging on production of 2,000 photocopies, and the copying operation using the developer with the carrier of Comparison Example 3 induced fogging on production of 1,000 photocopies. In either case, the test was terminated when obscure images were formed on production of about 100 to about 500 photocopies after the occurrence of fogging.

EXAMPLES 8 to 14

A copolymer comprising specific proportions (mole ratio) of VdF and a fluorine-containing unsaturated polymerizable compound was dissolved in 500 ml of a solvent to obtain a coating solution. One kilogram of spherical iron particles (trademark "DSP 135C," product of Dowa Iron Powder Co., Ltd.) serving as the carrier core material was coated with the solution by the conventional method using a fluidized bed apparatus, giving the carrier of the present invention with a coating layer of 2 μm thickness over the core.

The details of the copolymers, solvents and other material used in respective examples are as follows.

EXAMPLE 8

Copolymer: VdF/trifluorochloroethylene = 82.5/17.5, number average molecular weight = 80,000, 20 g Solvent: methyl isobutyl ketone

EXAMPLE 9

Copolymer: VdF/trifluoroethylene = 80/20, number average molecular weight = 50,000, 20 g Solvent: methyl isobutyl ketone

EXAMPLE 10

Copolymer: VdF/hexafluoroacetone = 88/12, number average molecular weight = 100,000, 20 g Solvent: ethyl acetate/cyclohexanone (=95/5)

EXAMPLE 11

Copolymer: VdF/hexafluoropropylene = 85/15, number average molecular weight = 100,000, 20 g Solvent: methyl ethyl ketone/methyl isobutyl ketone (=50/50)

EXAMPLE 12

Copolymer: a mixture of 10 g of the same copolymer as used in Example 1 and 10 g of a methyl methacrylate polymer (trademark "ACRYPET MF," product of Mitsubishi Rayon Co., Ltd.)

Solvent: methyl isobutyl ketone

EXAMPLE 13

Copolymer: 12 g of the same copolymer as used in Example 1

Solvent: methyl isobutyl ketone

Spherical iron particles: "Shinto 100-M" (trademark, product of Shinto Brator K.K.), 1 kg

EXAMPLE 14

Copolymer: VdF/trifluorochloroethylene/trifluoroethylene = 78/15/7, number average molecular weight = 60,000, 20 g Solvent: methyl isobutyl ketone Spherical iron particles: "SHINTO 100-M" (trademark, product of Shinto Brater K.K.), 1 kg

Comparison Example 4

A comparative carrier was obtained using a VdF/TFE copolymer (VdF/TFE = 80/20, number average molecular weight of 130,000) and acetone as a solvent.

Test Example 3

Each carrier obtained in Examples 8 to 14 and Comparison Example 4 was stirred by a ball mill for 100 hours, and the degree of peel resistance was evaluated by comparing the amounts of the coating dissolved out before and after the stirring.

Table 2 shows the results. The coatings of the carrier specimens of Examples 13 and 14 had a thickness of 2 μm and the coatings of the other specimens had a thickness of 3 μm.

TABLE 2

| | Degree of peel resistance |
|---|---|
| Example | |
| 8 | A |
| 9 | A |
| 10 | A |
| 11 | B |
| 12 | A |
| 13 | A |
| 14 | A |
| Comp. Example | |
| 4 | C |

Table 2 shows that the carriers of the second invention had coatings of high strength with excellent adhesion.

Test Example 4

Five parts by weight of the toner prepared in the same manner as in Test Example 2 was mixed with 100 parts by weight of each carrier obtained in Examples 8 to 14 and Comparison Example 4, producing a developer for electronic photographic copying machines.

Using the developers thus prepared, a copying operation was continuously conducted in the same manner as in Test Example 2 for production of 2,500 photocopies. No fogging was found in the images thus formed using the developers with the carriers of Examples 8 to 14.

On the other hand, the copying operation using the developer with the carrier of Comparison Example 4 initiated fogging on production of 2,000 photocopies. The test was terminated when unclear images were given on production of about 100 to about 500 photocopies after the occurrence of fogging.

We claim:

1. A carrier for developing electrostatic images, the carrier comprising a core and a coating on the core, the coating being formed from a copolymer comprising about 50 to about 90 mole % of vinylidene fluoride and about 50 to about 10 mole % of at least one of perfluoro(alkyl vinyl ethers) represented by the formula:

$$CF=CF-(O-CF_2CF)_m-O-(CF_2)_nCF_2X$$
$$|$$
$$CF_3$$

wherein X is hydrogen or fluorine, m is an integer of 0 to 4 and n is an integer of 0 to 7.

* * * * *

$$CF=CF-(O-CF_2CF)_m-O-(CF_2)_nCF_2X$$
$$|$$
$$CF_3$$

wherein X is hydrogen or fluorine, m is an integer of 0 to 4 and n is an integer of 0 to 7.

* * * * *